(12) United States Patent
Freier et al.

(10) Patent No.: US 9,476,554 B2
(45) Date of Patent: Oct. 25, 2016

(54) RECTANGULAR LIGHT DUCT EXTRACTION

(71) Applicant: 3M INNOVATIVE PROPERTIES COMPANY, St. Paul, MN (US)

(72) Inventors: David G. Freier, St. Paul, MN (US); Vadim N. Savvateev, St. Paul, MN (US); Thomas R. J. Corrigan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/434,450

(22) PCT Filed: Oct. 21, 2013

(86) PCT No.: PCT/US2013/065877
§ 371 (c)(1),
(2) Date: Apr. 9, 2015

(87) PCT Pub. No.: WO2014/070498
PCT Pub. Date: May 8, 2014

(65) Prior Publication Data
US 2015/0267885 A1    Sep. 24, 2015

Related U.S. Application Data

(60) Provisional application No. 61/720,118, filed on Oct. 30, 2012.

(51) Int. Cl.
*F21V 13/04* (2006.01)
*F21V 5/02* (2006.01)
(Continued)

(52) U.S. Cl.
CPC ............ *F21S 19/005* (2013.01); *F21S 11/007* (2013.01); *F21V 5/005* (2013.01); *F21V 7/0008* (2013.01);
(Continued)

(58) Field of Classification Search
CPC ..... F21S 19/005; F21S 11/007; F21V 5/005; F21V 7/0008; F21V 13/04; G02B 6/0096; G02B 6/001; G02B 6/0036; G02B 6/0053; G02B 6/0058
See application file for complete search history.

(56) References Cited

U.S. PATENT DOCUMENTS

| 5,339,382 A | 8/1994 | Whitehead |
| 5,661,839 A | 8/1997 | Whitehead |

(Continued)

FOREIGN PATENT DOCUMENTS

| JP | 2000-149628 | 5/2000 |
| WO | WO 92-22768 | 12/1992 |

(Continued)

OTHER PUBLICATIONS

Int'l Search Report for PCT Appl. No. PCT/US2013/065877, Mailed Feb. 4, 2014, 4 pp.

(Continued)

*Primary Examiner* — Alan Cariaso
(74) *Attorney, Agent, or Firm* — Jeffrey S. Kollodge

(57) ABSTRACT

The present disclosure describes light delivery and distribution components of a ducted lighting system having a cross-section that includes planar duct portions, and a light source. The delivery and distribution system (that is, light duct and light duct extractor) can function effectively with any light source that is capable of delivering light which is substantially collimated about the longitudinal axis of the light duct, and which is also preferably substantially uniform over the inlet of the light duct.

20 Claims, 7 Drawing Sheets

(51) Int. Cl.
    *G02B 6/42*           (2006.01)
    *F21S 19/00*         (2006.01)
    *F21S 11/00*         (2006.01)
    *F21V 5/00*          (2015.01)
    *F21V 7/00*          (2006.01)
    *F21V 8/00*          (2006.01)
    *F21Y 101/02*       (2006.01)

(52) U.S. Cl.
    CPC ............ *F21V 13/04* (2013.01); *G02B 6/0096* (2013.01); *F21Y 2101/02* (2013.01); *G02B 6/001* (2013.01); *G02B 6/0036* (2013.01); *G02B 6/0053* (2013.01); *G02B 6/0058* (2013.01)

(56) References Cited

U.S. PATENT DOCUMENTS

| | | | |
|---|---|---|---|
| 5,816,677 A | 10/1998 | Kurematsu |
| 6,024,462 A | 2/2000 | Whitehead |
| 7,147,903 B2 | 12/2006 | Ouderkirk |
| 7,991,257 B1 | 8/2011 | Coleman |
| 2003/0198455 A1 | 10/2003 | Usami |
| 2007/0092728 A1 | 4/2007 | Ouderkirk |
| 2007/0201246 A1 | 8/2007 | Yeo et al. |
| 2010/0156953 A1 | 6/2010 | Nevitt |
| 2010/0238686 A1 | 9/2010 | Weber |
| 2011/0032449 A1 | 2/2011 | Freier |
| 2011/0222295 A1 | 9/2011 | Weber |
| 2012/0057350 A1 | 3/2012 | Freier |

FOREIGN PATENT DOCUMENTS

| | | |
|---|---|---|
| WO | WO 2009-032813 | 3/2009 |
| WO | WO 2010-075357 | 7/2010 |
| WO | WO 2012-021471 | 2/2012 |
| WO | WO 2012-144268 | 10/2012 |
| WO | WO 2013-112362 | 8/2013 |
| WO | WO 2014-070495 | 5/2014 |

OTHER PUBLICATIONS

Search Report for China Appl. No. 201380052714.0, dated Jan. 25, 2016, 1 pp.

RECTANGULAR LIGHT DUCT EXTRACTION

RELATED CASES

This application is related to the following U.S. Patent Application filed on an even date herewith, entitled CURVED LIGHT DUCT EXTRACTION 61/720,124, and which is incorporated herein by reference.

BACKGROUND

The long-distance transport of visible light through a building can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported.

SUMMARY

The present disclosure describes light delivery and distribution components of a ducted lighting system having a cross-section that includes planar duct portions, and a light source. The delivery and distribution system (that is, light duct and light duct extractor) can function effectively with any light source that is capable of delivering light which is substantially collimated about the longitudinal axis of the light duct, and which is also preferably substantially uniform over the inlet of the light duct. In one aspect, the present disclosure provides a lighting element that includes a light duct having a longitudinal axis, a light duct cross-section perpendicular to the longitudinal axis, a reflective interior surface defining a cavity, and an exterior surface. The lighting element further includes a plurality of voids disposed in the reflective interior surface defining a light output surface, whereby light can exit the cavity; and a turning film disposed adjacent to the light output surface and exterior to the cavity, the turning film having parallel prismatic microstructures, each of the parallel prismatic microstructures having a vertex adjacent the light output surface of the light duct. The lighting element still further includes a steering film having a plurality of ridges adjacent the turning film and opposite the light output surface, each ridge parallel to the longitudinal axis and disposed to refract an incident light ray from the turning film, wherein a light ray that exits the cavity through the light output surface is redirected by the turning film within a first plane perpendicular to the light duct cross-section, and further redirected by the steering film within a second plane parallel to the light duct cross section.

In another aspect, the present disclosure provides a lighting element that includes a light duct having a longitudinal axis, a light duct cross-section perpendicular to the longitudinal axis, a reflective interior surface defining a cavity, and an exterior surface. The lighting element further includes a plurality of voids disposed in the reflective interior surface defining a light output surface, whereby light can exit the cavity; and a turning film disposed adjacent to the light output surface and exterior to the cavity, the turning film including parallel prismatic microstructures, each of the parallel prismatic microstructures having a vertex adjacent the light output surface of the light duct. The lighting element still further includes a two-dimensional steering film comprising a plurality of microstructures adjacent the turning film and opposite the light output surface, each microstructure disposed to refract an incident light ray from the turning film, wherein a light ray that exits the cavity through the light output surface is redirected by the turning film within a first plane perpendicular to the light duct cross-section, and further redirected by the two-dimensional steering film within the first plane and a second plane parallel to the light duct cross section.

In yet another aspect, the present disclosure provides a lighting system that includes a lighting element and a light source configured to inject light into the lighting element within a collimation half-angle less than 30 degrees of a longitudinal direction parallel to the longitudinal axis. The lighting element includes a light duct having a longitudinal axis, a light duct cross-section perpendicular to the longitudinal axis, a reflective interior surface defining a cavity, and an exterior surface. The lighting element further includes a plurality of voids disposed in the reflective interior surface defining a light output surface, whereby light can exit the cavity; and a turning film disposed adjacent to the light output surface and exterior to the cavity, the turning film having parallel prismatic microstructures, each of the parallel prismatic microstructures having a vertex adjacent the light output surface of the light duct. The lighting element still further includes a steering film having a plurality of ridges adjacent the turning film and opposite the light output surface, each ridge parallel to the longitudinal axis and disposed to refract an incident light ray from the turning film wherein a light ray that exits the cavity through the light output surface is redirected by the turning film within a first plane perpendicular to the light duct cross-section, and further redirected by the steering film within a second plane parallel to the light duct cross section. The collimation half-angle of the light is maintained as the light travels along the light duct cavity, exits the cavity through the plurality of voids, and is redirected by the turning film.

In yet another aspect, the present disclosure provides a lighting system that includes a lighting element and a light source configured to inject light into the lighting element within a collimation half-angle less than 30 degrees of a longitudinal direction parallel to the longitudinal axis. The lighting element includes a light duct having a longitudinal axis, a light duct cross-section perpendicular to the longitudinal axis, a reflective interior surface defining a cavity, and an exterior surface. The lighting element further includes a plurality of voids disposed in the reflective interior surface defining a light output surface, whereby light can exit the cavity; and a turning film disposed adjacent to the light output surface and exterior to the cavity, the turning film including parallel prismatic microstructures, each of the parallel prismatic microstructures having a vertex adjacent the light output surface of the light duct. The lighting element still further includes a two-dimensional steering film comprising a plurality of microstructures adjacent the turning film and opposite the light output surface, each microstructure disposed to refract an incident light ray from the turning film, wherein a light ray that exits the cavity through the light output surface is redirected by the turning film within a first plane perpendicular to the light duct cross-section, and further redirected by the two-dimensional steering film within the first plane and a second plane parallel to the light duct cross section.

In yet another aspect, the present disclosure provides a method for illuminating a region that includes providing a lighting element; and selecting an illumination region exterior to the lighting element. The lighting element includes a light duct having a longitudinal axis, a light duct cross-section perpendicular to the longitudinal axis, a reflective interior surface defining a cavity, and an exterior surface. The lighting element further includes a plurality of voids disposed in the reflective interior surface defining a light output surface, whereby light can exit the cavity; and a turning film disposed adjacent to the light output surface and exterior to the cavity, the turning film having parallel prismatic microstructures, each of the parallel prismatic microstructures having a vertex adjacent the light output surface of the light duct. The lighting element still further includes a steering film having a plurality of ridges adjacent the turning film and opposite the light output surface, each ridge parallel to the longitudinal axis and disposed to refract an incident light ray from the turning film wherein a light ray that exits the cavity through the light output surface is redirected by the turning film within a first plane perpendicular to the light duct cross-section, and further redirected by the steering film within a second plane parallel to the light duct cross section. The method for illuminating a region further includes selecting the plurality of voids, the turning film and the steering film to direct the light beam that exits the cavity to the illumination region; and injecting light into the light duct within a collimation half-angle less than 30 degrees of a propagation parallel to the longitudinal axis, whereby the light beam that exits the cavity is directed to the illumination region.

In yet another aspect, the present disclosure provides a method for illuminating a region that includes providing a lighting element; and selecting an illumination region exterior to the lighting element. The lighting element includes a light duct having a longitudinal axis, a light duct cross-section perpendicular to the longitudinal axis, a reflective interior surface defining a cavity, and an exterior surface. The lighting element further includes a plurality of voids disposed in the reflective interior surface defining a light output surface, whereby light can exit the cavity; and a turning film disposed adjacent to the light output surface and exterior to the cavity, the turning film including parallel prismatic microstructures, each of the parallel prismatic microstructures having a vertex adjacent the light output surface of the light duct. The lighting element still further includes a two-dimensional steering film comprising a plurality of microstructures adjacent the turning film and opposite the light output surface, each microstructure disposed to refract an incident light ray from the turning film, wherein a light ray that exits the cavity through the light output surface is redirected by the turning film within a first plane perpendicular to the light duct cross-section, and further redirected by the two-dimensional steering film within the first plane and a second plane parallel to the light duct cross section. The method for illuminating a region further includes selecting the plurality of voids, the turning film and the steering film to direct the light beam that exits the cavity to the illumination region; and injecting light into the light duct within a collimation half-angle less than 30 degrees of a propagation parallel to the longitudinal axis, whereby the light beam that exits the cavity is directed to the illumination region.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
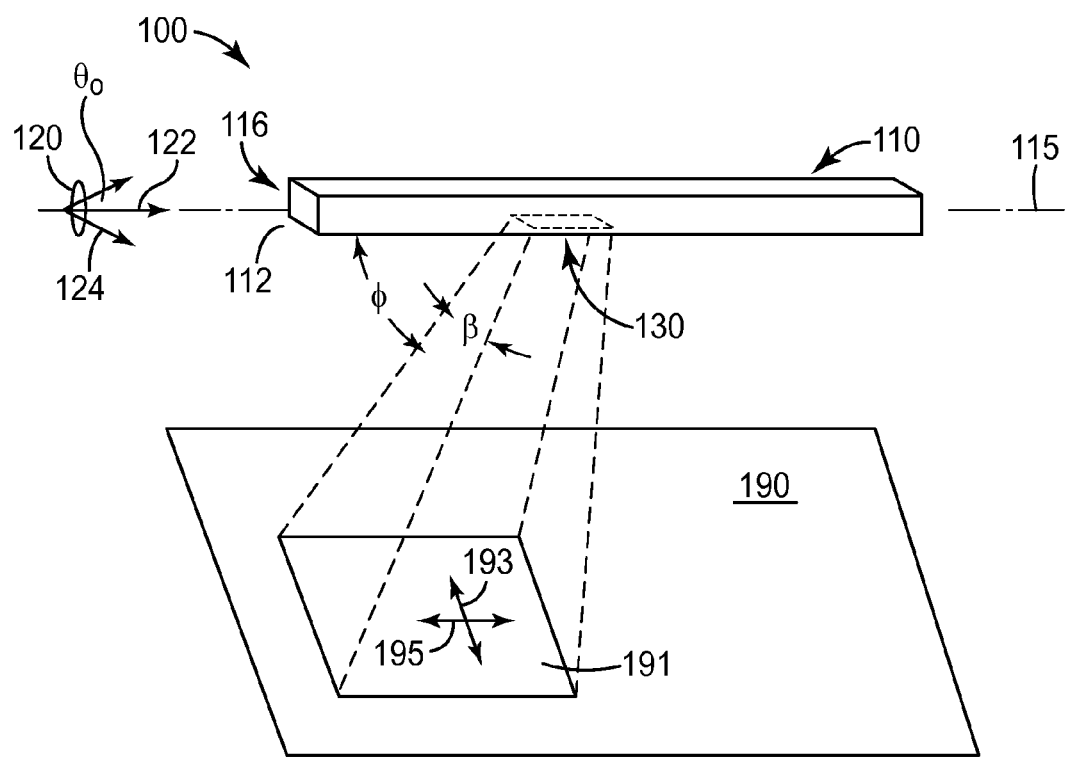
FIG. 1 shows a perspective schematic view of a lighting system.

The present disclosure describes light delivery and distribution components of a ducted lighting system having a cross-section that includes planar portions, and a light source. The delivery and distribution system (that is, light duct and light duct extractor) can function effectively with any light source that is capable of delivering light which is substantially collimated about the longitudinal axis of the light duct, and which is also preferably substantially uniform over the inlet of the light duct.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

The elements of and construction of light sources that can provide suitable solar light input are described elsewhere, for example, in U.S. Patent Application Ser. No. 61/589,544 entitled OFF AXIS CASSEGRAIN SOLAR COLLECTOR filed Jan. 23, 2012, and PCT Patent Publication No. WO2012021471 entitled CONCENTRATING DAYLIGHT COLLECTOR filed Aug. 13, 2010, which generally describe solar collectors which can provide sunlight with the required characteristics. The addition of an artificial light source, alone or in combination with a solar collector, can be useful to broadening the utility of the light delivery and distribution system described herein. For the purposes of the present disclosure, the description of the 'lighting system' references both solar and artificial sources.

Architectural daylighting using mirror-lined light ducts can deliver sunlight deep into the core of multi-floor buildings. Such mirror-lined light ducts can be uniquely enabled by the use of 3M optical films, including mirror films such as Vikuiti™ ESR film, that have greater than 98% specular reflectivity across the visible spectrum of light. Architectural daylighting is a multi-component system that includes a device for collecting sunlight, and light ducts and extractors for transporting and distributing the sunlight within the building. The typical benefits of using sunlight for interior lighting can include a reduction of energy for office lighting by an average of 25%, improved light quality due to the full spectrum light delivered, and is often more pleasing to office occupants.

The ducted illumination systems useful for architectural daylighting can also be useful for distribution of auxiliary or artificially generated light efficiently throughout a building. For example, it is widely accepted that LED lighting may eventually replace a substantial portion of the world's installed base of incandescent, fluorescent, metal halide, and sodium-vapor fixtures. One of the primary driving forces is the projected luminous efficacy of LEDs versus those of these other sources. Some of the challenges to utilization of LED lighting include (1) reduce the maximum luminance emitted by the luminaire far below the luminance emitted by the LEDs (for example, to eliminate glare); (2) promote uniform contributions to the luminance emitted by the luminaire from every LED in the fixture (that is, promote color mixing and reduce device-binning requirements); (3) preserve the small etendue of LED sources to control the angular distribution of luminance emitted by the luminaire (that is, preserve the potential for directional control); (4) avoid rapid obsolescence of the luminaire in the face of rapid evolution of LED performance (that is, facilitate updates of LEDs without replacement of the luminaire); (5) facilitate access to customization of luminaires by users not expert in optical design (that is, provide a modular architecture); and (6) manage the thermal flux generated by the LEDs so as to consistently realize their entitlement performance without excessive weight, cost, or complexity (that is, provide effective, light-weight, and low-cost thermal management).

When coupled to a collimated LED light source, the ducted light-distribution system described herein can address challenges (1)-(5) in the following manners (challenge 6 concerns specific design of the LED lighting element):

(1) The light flux emitted by the LEDs is emitted from the luminaire with an angular distribution of luminance which is substantially uniform over the emitting area. The emitting area of the luminaire is typically many orders of magnitude larger than the emitting area of the devices, so that the maximum luminance is many orders of magnitude smaller.

(2) The LED devices in any collimated source can be tightly clustered within an array occupying a small area, and all paths from these to an observer involve substantial distance and multiple bounces. For any observer in any position relative to the luminaire and looking anywhere on the emitting surface of a luminaire, the rays incident upon your eye can be traced within its angular resolution backwards through the system to the LED devices. These traces will land nearly uniformly distributed over the array due to the multiple bounces within the light duct, the distance traveled, and the small size of the array. In this manner, an observer's eye cannot discern the emission from individual devices, but only the mean of the devices.

(3) The typical orders of magnitude increase in the emitting area of the luminaire relative to that of the LEDs implies a concomitant ability to tailor the angular distribution of luminance emitted by the luminaire, regardless of the angular distribution emitted by the LEDs. The emission from the LEDs is collimated by the source and conducted to the emitting areas through a mirror-lined duct which preserves this collimation. The emitted angular distribution of luminance is then tailored within the emitting surface by the inclusion of appropriate micro structured surfaces. Alternately, the angular distribution in the far field of the luminaire is tailored by adjusting the flux emitted through a series of perimeter segments which face different directions. Both of these means of angular control are possible only because of the creation and maintenance of collimation within the light duct.

(4) By virtue of their close physical proximity, the LED sources can be removed and replaced without disturbing or replacing the bulk of the lighting system.

(5) Each performance attribute of the system is influenced primarily by one component. For example, the local percent open area of the perforated ESR determines the spatial distribution of emission, and the shape of optional decollimation-film structures (also referred to herein as "steering film" structures) largely determines the cross-duct angular distribution. It is therefore feasible to manufacture and sell a limited series of discrete components (for example, perforated ESR with a series of percent open areas, and a series of decollimation films for standard half angles of uniform illumination) that enable users to assemble an enormous variety of lighting systems.

One component of the light ducting portion of an illumination system is the ability to extract light from desired portions of the light duct efficiently, and without adversely degrading the light flux passing through the light duct to the rest of the ducted lighting system. Without the ability to extract the light efficiently, any architectural lighting system would be limited to short-run light ducts only, which could significantly reduce the attractiveness of distributing high intensity light such as concentrated sunlight or LED generated illumination for interior lighting.

For those devices designed to transmit light from one location to another, such as a light duct, it is desirable that the optical surfaces absorb and transmit a minimal amount of light incident upon them while reflecting substantially all of the light. In portions of the device, it may be desirable to deliver light to a selected area using generally reflective optical surfaces and to then allow for transmission of light out of the device in a known, predetermined manner. In such devices, it may be desirable to provide a portion of the optical surface as partially reflective to allow light to exit the device in a predetermined manner, as described herein.

Where multilayer optical film is used in any optical device, it will be understood that it can be laminated to a support (which itself may be transparent, opaque reflective or any combination thereof) or it can be otherwise supported using any suitable frame or other support structure because in some instances the multilayer optical film itself may not be rigid enough to be self-supporting in an optical device.

Generally, the combination of the positioning and distribution of the plurality of voids, the structured surface of the turning film, and the structured surface of the steering film can be independently adjusted to control the direction and collimation of the light beams exiting through the light duct extractor. Control of the emission in the down-duct direction can be influenced by the distribution of the plurality of voids and the structure of the turning film disposed adjacent the plurality of voids. Control of the emission in the cross-duct direction can also be influenced by the distribution of the plurality of voids, and the structure of the steering film disposed adjacent the turning film. This is illustrated in FIG. 1 for a rectangular light duct and a horizontal target surface. Different locations on the planar surfaces of the light duct can illuminate different localized areas on the target surface, as described elsewhere. Tailoring the percent open area of the perforated ESR at different locations to alter the local intensity of the emitted luminance provides the means to create desired patterns of illuminance on the target surface.

FIG. 1 shows a perspective schematic view of a lighting system 100, according to one aspect of the disclosure. Lighting system 100 includes a light duct 110 having a longitudinal axis 115 and a reflective inner surface 112 surrounding a cavity 116. A partially collimated light beam 120 having a central light ray 122 and boundary light rays 124 disposed within a collimation half-angle $\theta_0$ of the longitudinal axis 115 can be efficiently transported along the light duct 110. A portion of the partially collimated light beam 120 can leave the light duct 110 through a light output surface 130 where light is extracted, as described elsewhere. In general, any desired number of light output surfaces can be disposed at different locations on any of the light ducts described herein. Light rays leaving the light output surface 130 are directed onto an illumination region 191 of an intercepting surface 190. The illumination region 191 can be positioned as desired on the intercepting surface 190, along a first direction 193 perpendicular to the longitudinal axis 115 and also along a second direction 195 parallel to the longitudinal axis 115. The size and shape of the illumination region 191 can also be varied, resulting in differing values of the radial output angle β and the longitudinal output angle φ from the light duct 110, as described elsewhere. The light rays that leave the light output surface 130 can be configured to create any desired level and pattern of illumination on the illumination region 191, as described elsewhere.

In one particular embodiment, partially collimated light beam 120 includes a cone of light having a propagation direction within an input light divergence angle $\theta_0$ (that is, a collimation half-angle $\theta_0$) from central light ray 122. The divergence angle $\theta_0$ of partially collimated light beam 120 can be symmetrically distributed in a cone around the central light ray 122, or it can be non-symmetrically distributed. In some cases, the divergence angle $\theta_0$ of partially collimated light beam 120 can range from about 0 degrees to about 30 degrees, or from about 0 degrees to about 25 degrees, or from about 0 degrees to about 20 degrees, or even from about 0 degrees to about 15 degrees. In one particular embodiment, the divergence angle $\theta_0$ of partially collimated light beam 120 can be about 23 degrees.

Partially collimated light rays are injected into the interior of the light duct along the direction of the axis of the light duct. A perforated reflective lining of the light duct (for example, perforated 3M Enhanced Specular Reflector (ESR) film) lines the light duct. A light ray which strikes the ESR between perforations is specularly reflected and returned to the light duct within the same cone of directions as the incident light. Generally, the reflective lining of ESR is at least 98 percent reflective at most visible wavelengths, with no more than 2 percent of the reflected light directed more than 0.5 degrees from the specular direction. A light ray which strikes within a perforation passes through the ESR with no change in direction. (Note that the dimensions of the perforations within the plane of the ESR are assumed large relative to its thickness, so that very few rays strike the interior edge of a perforation.) The probability that a ray strikes a perforation and therefore exits the light duct is proportional to the local percent open area of the perforated ESR. Thus, the rate at which light is extracted from the light duct can be controlled by adjusting this percent open area.

The half angle in the circumferential direction is comparable to the half angle of collimation within the light duct. The half angle in the longitudinal direction is approximately one-half the half angle within the light duct; that is, only half of the directions immediately interior to the ESR have the opportunity to escape through a perforation. Thus, the precision of directing the light in a desired direction increases as the half angle within the light duct decreases.

Light rays that pass through a perforation next encounter a prismatic turning film. The light rays strike the prisms of the turning film in a direction substantially parallel to the plane of the turning film and perpendicular to the axes of the prisms—the divergence of their incidence from this norm is dictated by the collimation within the light duct. A majority of these rays enter the film by refracting through the first prism face encountered, then undergoing total internal reflection (TIR) from the opposing face, and finally refract through the bottom of the film. There is no net change in the direction of propagation perpendicular to the axis of the light duct. The net change in direction along the axis of the light duct can be readily calculated by using the index of refraction of the turning film prism material and the included angle of the prisms. In general these are selected to yield an angular distribution of transmission centered about the downward normal to the film. Since most rays are transmitted, very little light is returned to the light duct, facilitating the maintenance of collimation within the light duct.

Light rays that pass through the turning film can next encounter a decollimation film or plate (also referred to as a steering film), as described elsewhere. The rays encountering the steering film strike the structured surface of this film substantially normal to the plane of the film. The majority of these pass through the structured surface, are refracted into directions determined by the local slope of the structure, and pass through the bottom surface. For these light rays, there is no net change in the direction of propagation along the axis of the light duct. The net change in direction perpendicular to the axis is determined by the index of refraction and the distribution of surface slopes of the structure. The steering film structure can be a smooth curved surface such as a cylindrical or aspheric ridge-like lens, or can be piecewise planar, such as to approximate a smooth curved lens structure. In general the steering film structures are selected to yield a specified distribution of illuminance upon target surfaces occurring at distances from the light duct large compared to the cross-duct dimension of the emissive surface. Again, since most rays are transmitted, very little light is returned to the light duct, preserving the collimation within the light duct.

In many cases the turning film and steering film, if present, may use a transparent support plate or tube surrounding the light duct (depending on the light duct configuration). In one particular embodiment, the transparent support can be laminated to the outermost film component, and can include an anti-reflective coating on the outermost surface. Both lamination and AR coats increase transmission through and decrease reflection from the outermost component, increasing the overall efficiency of the lighting system, and better preserving the collimation within the light duct.

Figure 2A:
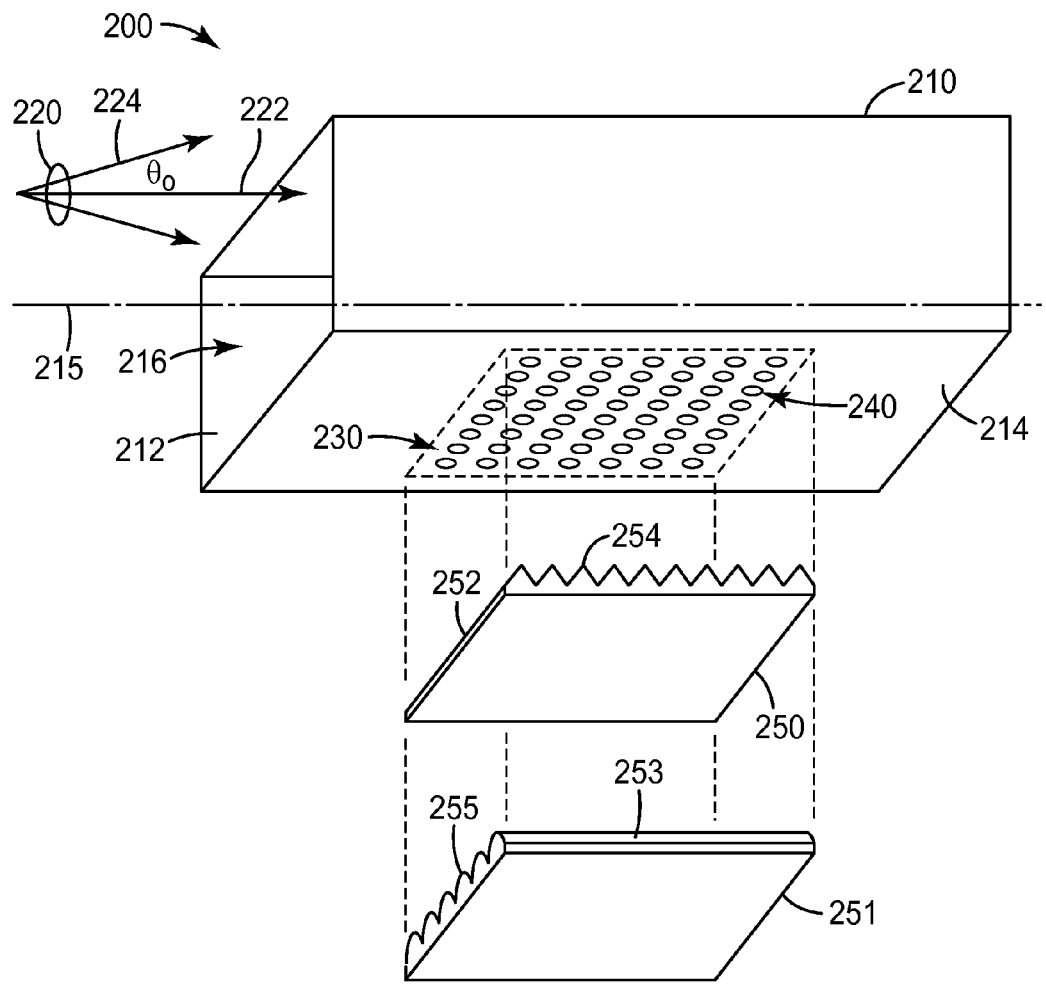
FIG. 2A shows an exploded perspective schematic view of a lighting element.

FIG. 2A shows an exploded perspective schematic view of a lighting element 200 that includes a rectangular light duct extractor, according to one aspect of the disclosure. Each of the elements 210-230 shown in FIG. 2A correspond to like-numbered elements 110-130 shown in FIG. 1, which have been described previously. For example, light duct 210 shown in FIG. 2A corresponds to light duct 110 shown in FIG. 1, and so on. Lighting element 200 includes a light duct 210 having a longitudinal axis 215 and a reflective surface 212 surrounding a cavity 216. A partially collimated light beam 220 having a central light ray 222 and boundary light rays 224 disposed within an input collimation half-angle $\theta_0$ of the longitudinal axis 215 can be efficiently transported along the light duct 210. A portion of the partially collimated light beam 220 can leave the light duct 210 through a plurality of voids 240 disposed in the reflective surface 212 in a light output surface 230 where light is extracted. A turning film 250 having a plurality of parallel ridged microstructures 252 is positioned adjacent the light output surface 230 such that a vertex 254 corresponding to each of the parallel ridged microstructures 252 is positioned proximate an exterior surface 214 of light duct 210. The turning film 250 can intercept light rays exiting the cavity 216 through one of the plurality of voids 240.

A steering film 251 having a plurality of parallel ridges 253 each with a steering vertex 255, is positioned adjacent the turning film 250 and opposite the light output surface 230 of the light duct 210. Each of the plurality of parallel ridges 253 positioned parallel to the longitudinal axis 215 of light duct 210, such that each of the plurality of parallel ridges 253 can refract light rays exiting the turning film 250 into a direction perpendicular to the longitudinal axis 215, such that a light ray that exits the cavity through the light output surface 230 is redirected into a first direction disposed within a first plane perpendicular to the light duct cross-section by the turning film, and into a second direction within a second plane parallel to the light duct cross section by the steering film, as described elsewhere.

In one particular embodiment, each of the plurality of voids 240 can be physical apertures, such as holes that pass either completely through, or through only a portion of the thickness of the reflective surface 212. In one particular embodiment, each of the plurality of voids 240 can instead be solid clear or transparent regions such as windows, formed in the reflective surface 212 that do not substantially reflect light. In either case, the plurality of voids 240 designates a region of the reflective surface 212 where light can pass through, rather than reflect from the surface. The voids can have any suitable shape, either regular or irregular, and can include curved shapes such as arcs, circles, ellipses, ovals, and the like; polygonal shapes such as triangles, rectangles, pentagons, and the like; irregular shapes including X-shapes, zig-zags, stripes, slashes, stars, and the like; and combinations thereof.

The plurality of voids 240 can be made to have any desired percent open (that is, non-reflective) area from about 5% to about 95%. In one particular embodiment, the percent open area ranges from about 5% to about 60%, or from about 10% to about 50%. The size range of the individual voids can also vary, in one particular embodiment, the voids can range in major dimension from about 0.5 mm to about 5 mm, or from about 0.5 mm to about 3 mm, or from about 1 mm to about 2 mm.

In some cases, the voids can be uniformly distributed across the light output surface 230 and can have a uniform size. However, in some cases, the voids can have different sizes and distributions across the light output surface 230, and can result in a variable areal distribution of void (that is, open) across the output region, as described elsewhere. The plurality of voids 240 can optionally include switchable elements (not shown) that can be used to regulate the output of light from the light duct by changing the void open area gradually from fully closed to fully open, such as those described in, for example, co-pending U.S. Patent Publication No. US2012-0057350 entitled, SWITCHABLE LIGHT-DUCT EXTRACTION.

The voids can be physical apertures that may be formed by any suitable technique including, for example, die cut, laser cut, molded, formed, and the like. The voids can instead be transparent windows that can be provided of many different materials or constructions. The areas can be made of multilayer optical film or any other transmissive or partially transmissive materials. One way to allow for light transmission through the areas is to provide areas in optical surface which are partially reflective and partially transmissive. Partial reflectivity can be imparted to multilayer optical films in areas by a variety of techniques.

In one aspect, areas may comprise multi-layered optical film which is uniaxially stretched to allow transmission of light having one plane of polarization while reflecting light having a plane of polarization orthogonal to the transmitted light, such as described, for example, in U.S. Pat. No. 7,147,903 (Ouderkirk et al.), entitled "High Efficiency Optical Devices". In another aspect, areas may comprise multi-layered optical film which has been distorted in selected regions, to convert a reflective film into a light transmissive film. Such distortions can be effected, for example, by heating portions of the film to reduce the layered structure of the film, as described, for example, in PCT Publication No. WO2010075357 (Merrill et al.), entitled "internally Patterned Multilayer Optical Films using Spatially Selective Birefringence Reduction".

The selective birefringence reduction can be performed by the judicious delivery of an appropriate amount of energy to the second zone so as to selectively heat at least some of the interior layers therein to a temperature high enough to produce a relaxation in the material that reduces or eliminates a preexisting optical birefringence, but low enough to maintain the physical integrity of the layer structure within the film. The reduction in birefringence may be partial or it may be complete, in which case interior layers that are birefringent in the first zone are rendered optically isotropic in the second zone. In exemplary embodiments, the selective heating is achieved at least in part by selective delivery of light or other radiant energy to the second zone of the film.

In one particular embodiment, the turning film 250 can be a microstructured film such as, for example, Vikuiti™ Image Directing Films, available from 3M Company. The turning film 250 can include one plurality of parallel ridged microstructure shapes, or more than one different parallel ridged microstructure shapes, such as having a variety of included angles used to direct light in different directions, as described elsewhere.

Figure 2B:
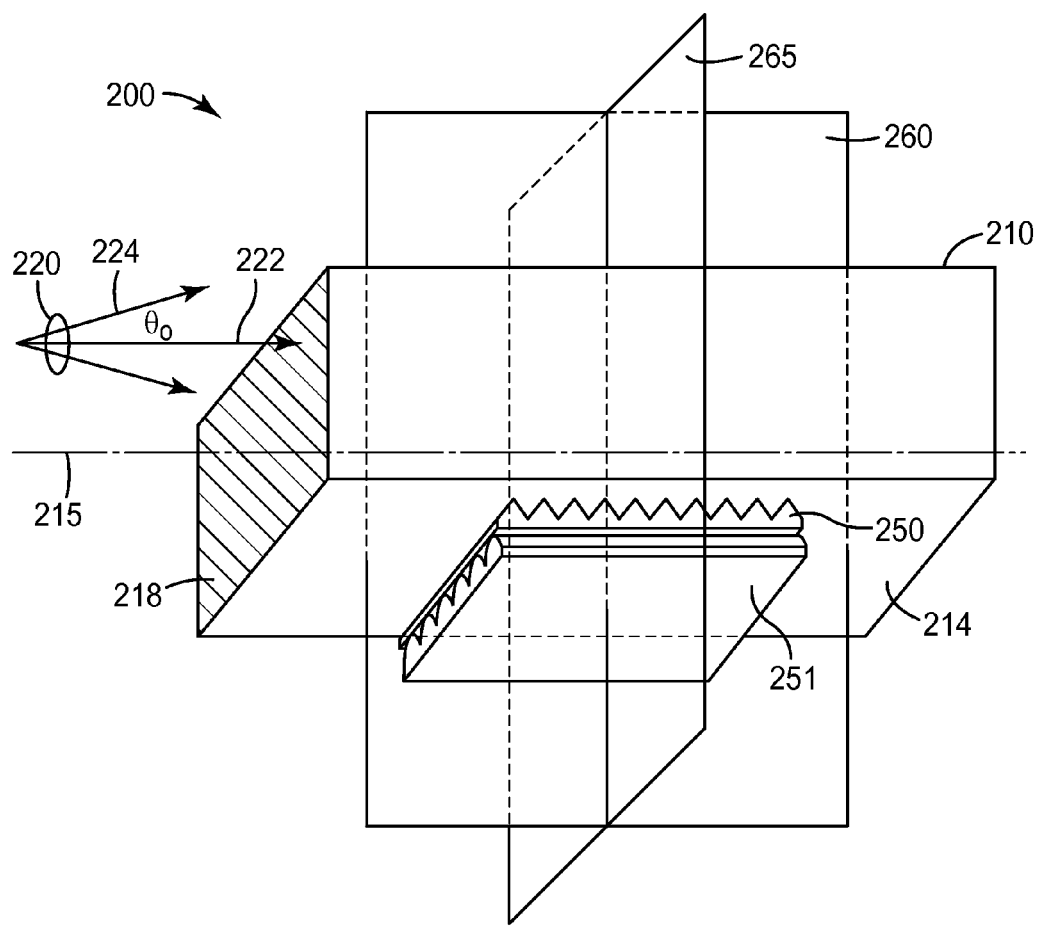
FIG. 2B shows a perspective schematic view of a lighting element.

FIG. 2B shows a perspective schematic view of the lighting element 200 of FIG. 2A, according to one aspect of the disclosure. The perspective schematic view shown in FIG. 2B can be used to further describe aspects of the lighting element 200. Each of the elements 210-250 shown in FIG. 2B correspond to like-numbered elements 210-250 shown in FIG. 2A, which have been described previously. For example, light duct 210 shown in FIG. 2B corresponds to light duct 210 shown in FIG. 2A, and so on. In FIG. 2B, a cross-section 218 of light duct 210 including the exterior 214 is perpendicular to the longitudinal axis 215, and a first plane 260 passing through the longitudinal axis 215 and the turning film 250 is perpendicular to the cross-section 218. In a similar manner, a second plane 265 is parallel to the cross-section 218 and perpendicular to both the first plane 260 and the turning film 250. As described herein, cross-section 218 generally includes a light output surface 230 disposed on a planar surface; in some cases, the light output surface 230 includes different planar segments of a planar-surface duct, as described elsewhere. Examples of some typical cross-section figures include triangles, squares, rectangles, pentagons, or other polygonal shapes.

The lighting element 200 further includes a steering film 251 disposed adjacent the turning film 250, such that the turning film 250 is positioned between the steering film 251 and the exterior 214 of the light duct 210. The steering film 251 is disposed to intercept light exiting from the turning film 250 and provide angular spread of the light in a radial direction (that is, in directions within second plane 265), as described elsewhere.

Figure 2C:
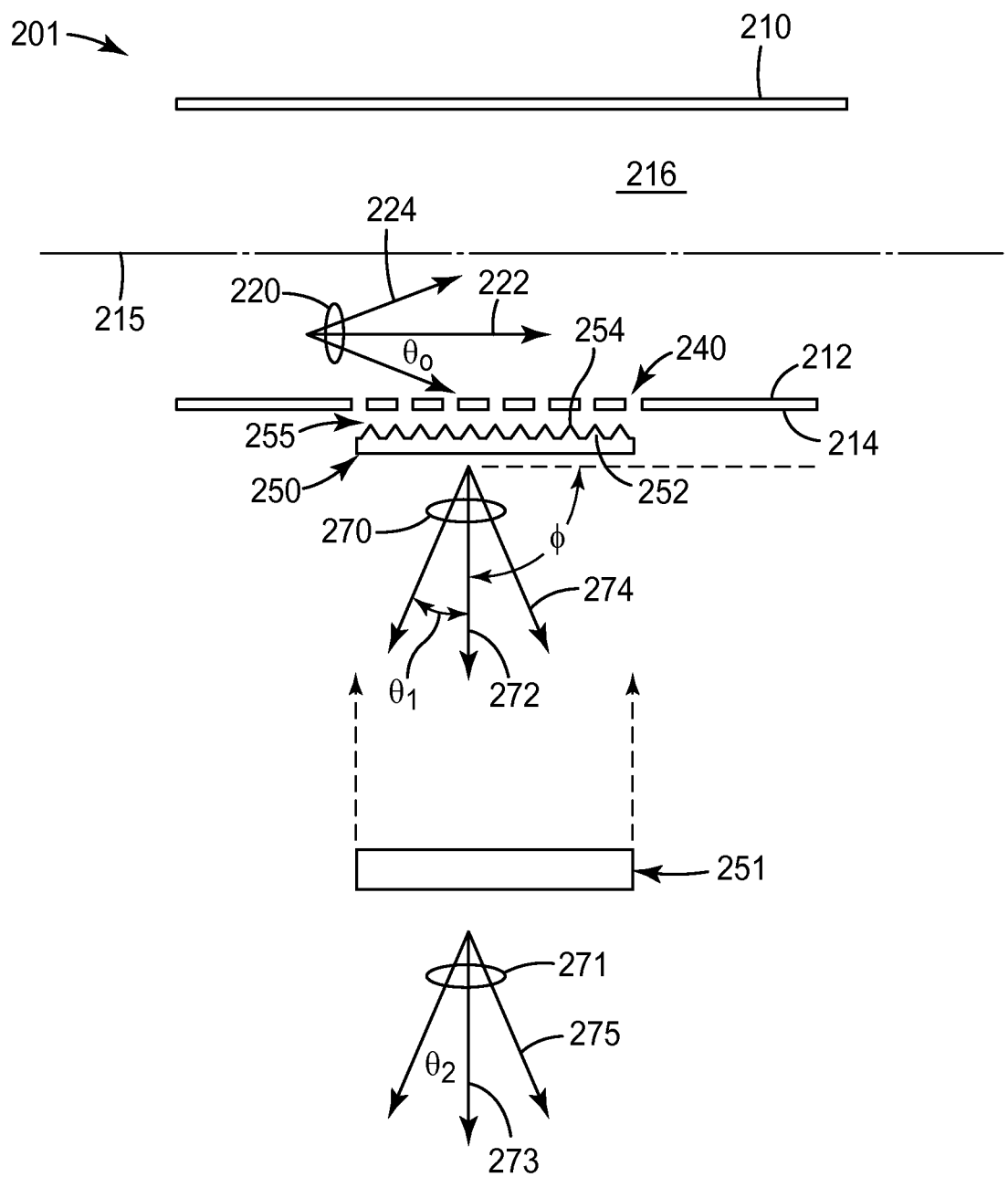
FIG. 2C shows a longitudinal cross-sectional schematic view of a lighting element.

FIG. 2C shows a longitudinal cross-sectional schematic view of a lighting element 201 that includes a rectangular light duct extractor, according to one aspect of the disclosure. Lighting element 201 can be a cross-section of the lighting element 200 of FIG. 2B, along the first plane 260. Each of the elements 210-250 shown in FIG. 2C correspond to like-numbered elements 210-250 shown in FIG. 2B, which have been described previously. For example, light duct 210 shown in FIG. 2C corresponds to light duct 210 shown in FIG. 2B, and so on.

Lighting element 201 includes a light duct 210 having a longitudinal axis 215 and a reflective surface 212 surrounding a cavity 216. A partially collimated light beam 220 having a central light ray 222 and boundary light rays 224 disposed within an input collimation half-angle $\theta_0$ of the longitudinal axis 215 can be efficiently transported along the light duct 210. A portion of the partially collimated light beam 220 can leave the light duct 210 through a plurality of voids 240 disposed in the reflective surface 212 in a light output surface 230 where light is extracted. A turning film 250 having a plurality of parallel ridged microstructures 252 is positioned adjacent the light output surface 230 such that a vertex 254 corresponding to each of the parallel ridged microstructures 252 is positioned proximate an exterior surface 214 of light duct 210. In one particular embodiment, each vertex 254 can be immediately adjacent the exterior surface 214; however, in some cases, each vertex 254 can instead be separated from the exterior surface 214 by a separation distance 255. The turning film 250 is positioned to intercept and redirect light rays exiting the cavity 216 through one of the plurality of voids 240.

The vertex 254 corresponding to each of the parallel ridged microstructures 252 has an included angle between planar faces of the parallel ridged microstructures 252 that can vary from about 30 degrees to about 120 degrees, or from about 45 degrees to about 90 degrees, or from about 55 degrees to about 75 degrees, to redirect light incident on the microstructures. In one particular embodiment, the included angle ranges from about 55 degrees to about 75 degrees and the partially collimated light beam 220 that exits through the plurality of voids 240 is redirected by the turning film 250 away from the longitudinal axis 215. The redirected portion of the partially collimated light beam 220 exits as a partially collimated output light beam 270 having a central light ray 272 and boundary light rays 274 disposed within an output collimation half-angle $\theta_1$ and directed at a longitudinal angle $\phi$ from the longitudinal axis 215. In some cases, the input collimation half-angle $\theta_0$ and the output collimation half angle $\theta_1$ can be the same, and the collimation of light is retained. The longitudinal angle $\phi$ from the longitudinal axis can vary from about 45 degrees to about 135 degrees, or from about 60 degrees to about 120 degrees, or from about 75 degrees to about 105 degrees, or can be approximately 90 degrees, depending on the included angle of the microstructures.

A steering film 251 is positioned adjacent the turning film 250 and opposite the light output surface 230 of the light duct 210 to intercept and refract the partially collimated output light beam 270. The partially collimated output light beam 270 exits the steering film 251 as a partially collimated steered light beam 271 having a central steered light ray 273 and boundary steered light rays 275 disposed within a steered collimation half-angle $\theta_2$, as described elsewhere.

Figure 2D:
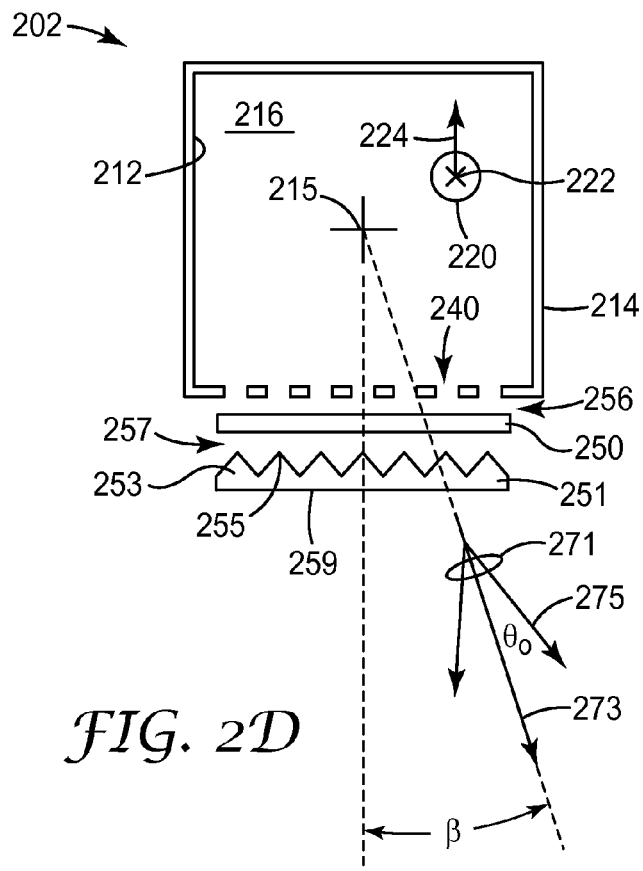
FIG. 2D shows a cross-sectional schematic view of a lighting element.

FIG. 2D shows a cross-sectional schematic view of a lighting element 202 that includes a rectangular light duct extractor, according to one aspect of the disclosure. Lighting element 202 can be a cross-section of the lighting element 200 of FIG. 2B, along the second plane 265. Each of the elements 210-250 shown in FIG. 2D correspond to like-numbered elements 210-250 shown in FIG. 2B, which have been described previously. For example, light duct 210 shown in FIG. 2D corresponds to light duct 210 shown in FIG. 2B, and so on.

Lighting element 202 includes a light duct 210 having a longitudinal axis 215 and a reflective surface 212 surrounding a cavity 216. A partially collimated light beam 220 having a central light ray 222 and boundary light rays 224 disposed within an input collimation half-angle $\theta_0$ of the longitudinal axis 215 can be efficiently transported along the light duct 210, shown directed into the paper as shown in FIG. 2D. A portion of the partially collimated light beam 220 can leave the light duct 210 through a plurality of voids 240 disposed in the reflective surface 212 where light is extracted. A turning film 250 is positioned adjacent the plurality of voids 240 as described with reference to FIG. 2C. The turning film 250 is positioned to intercept and redirect light rays exiting the cavity 216 through one of the plurality of voids 240, such that the redirection of light rays occurs in first plane 260 that passes through longitudinal axis 260. In one particular embodiment, the turning film 250 does not influence the path of light rays within the second plane 265 perpendicular to the longitudinal axis.

The path of light rays within the second plane 265, that is in radial directions about the longitudinal axis 215, is influenced by a steering film 251. The steering film 251 includes a planar output surface 259 and plurality of parallel ridges 253 each with a steering vertex 255, positioned adjacent the turning film 250 and opposite the light output surface 230 of the light duct 210. In one particular embodiment, each steering vertex 255 can be immediately adjacent the turning film 250; however, in some cases, each steering vertex 255 can instead be separated from the turning film 250 by a separation distance 257.

Each of the plurality of parallel ridges 253 can be positioned parallel to the longitudinal axis 215 of light duct 210, such that each of the plurality of parallel ridges 253 can refract light rays exiting the turning film 250 into a direction perpendicular to the longitudinal axis 215, such that a light ray that exits the cavity through the light output surface 230 is redirected into a first direction disposed within a first plane perpendicular to the light duct cross-section by the turning film, and into a second direction within a second plane parallel to the light duct cross section by the steering film.

In one particular embodiment, the partially collimated output light beam 270 exits the steering film 251 as a partially collimated steered light beam 271 having a central steered light ray 273 and boundary steered light rays 275 disposed within a steered collimation half-angle $\theta_2$. A first component of the central steered light ray 273 is directed within the second plane 265 in a second direction at a radial angle β from the first plane 260. A second component of the central steered light ray 273 is directed within the first plane 260 in a first direction at a longitudinal angle φ from the longitudinal axis. In some cases, each of the input collimation half-angle $\theta_0$, the output collimation half angle $\theta_1$, and the steered collimation half-angle $\theta_2$ can be the same, and the collimation of light is retained. The radial angle β around the longitudinal axis can vary from about 0 degrees to about ±90 degrees, or from about 0 degrees to about ±45 degrees, or from about 0 degrees to about ±30 degrees, of the light duct 210.

Figure 2E:
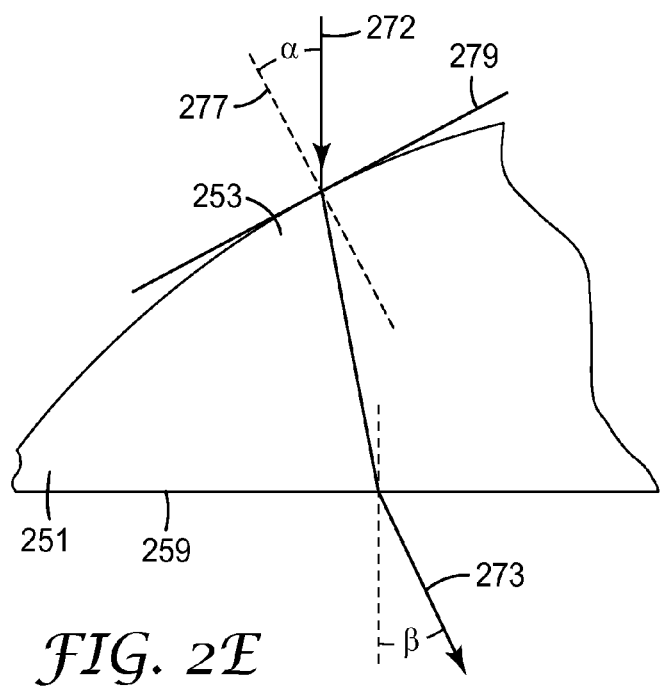
FIG. 2E shows a schematic of a light ray path through a steering film.

FIG. 2E shows a schematic of a light ray path through a steering film 251, according to one aspect of the disclosure. Each of the elements 251-273 shown in FIG. 2E correspond to like-numbered elements 251-273 shown in FIG. 2D, which have been described previously. For example, steering film 251 shown in FIG. 2E corresponds to steering film 251 shown in FIG. 2D, and so on. A central output light ray 272 from the turning film 250 of FIG. 2D travels in second plane 265 and intercepts one of the plurality of ridges 253 having a local tangent 279 and local normal 277 disposed at a local slope angle α to the first plane 260. Central output light ray 272 refracts through ridge 253, propagates through steering film 251, and refracts upon leaving through planar bottom surface 259 at a steering output angle β from first plane 260.

Figure 3:
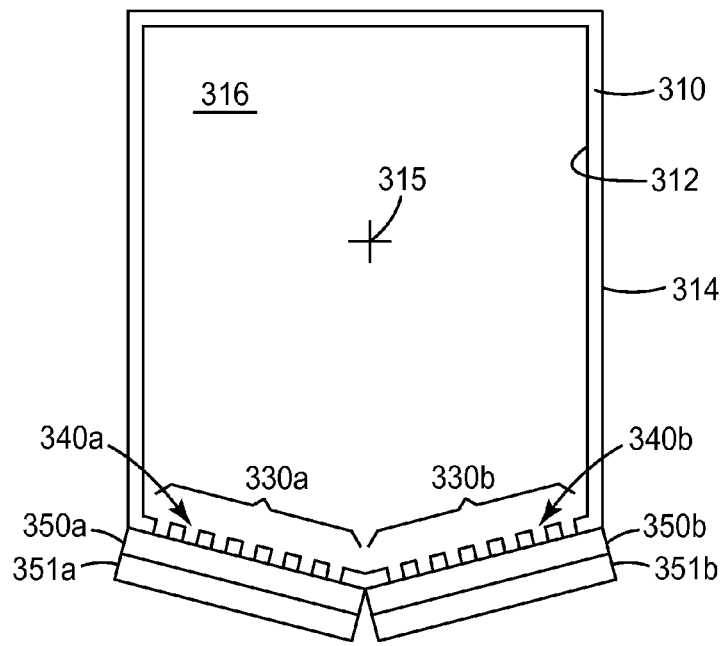
FIG. 3 shows a cross-sectional schematic of a lighting element.

FIG. 3 shows a cross-sectional schematic of a light duct extractor having two planar output surfaces, according to one aspect of the disclosure. Each of the elements 310-351 shown in FIG. 3 correspond to like-numbered elements 210-251 shown in FIG. 2B, which have been described previously. For example, longitudinal axis 315 shown in FIG. 3 corresponds to longitudinal axis 215 shown in FIG. 2B, and so on.

In FIG. 3, lighting element 302 includes a light duct 310 having a longitudinal axis 315, a reflective interior surface 312 surrounding a cavity 316, a first planar output surface 330a, and a second planar output surface 330b. The first and second planar output surfaces 330a, 330b, include a first and a second plurality of voids 340a, 340b, respectively. A first and a second turning film 350a, 350b, is disposed adjacent each of the first and second plurality of voids 340a, 340b. A first and a second optional steering film 351a, 351b, is disposed adjacent each of the first and second turning films 350a, 350b. In some cases, optional steering films 351a, 351b can be omitted, since the orientation of the first and second planar output surfaces 330a, 330b may be sufficient for directing the light where desired. The rectangular light duct 310a is representative of a variety of cross-sectional shapes including planar portions, and is intended to also represent other envisioned light duct cross-sections having planar portions including triangular, rectangular, square, pentagonal, and the like cross-sections.

Figure 4A:
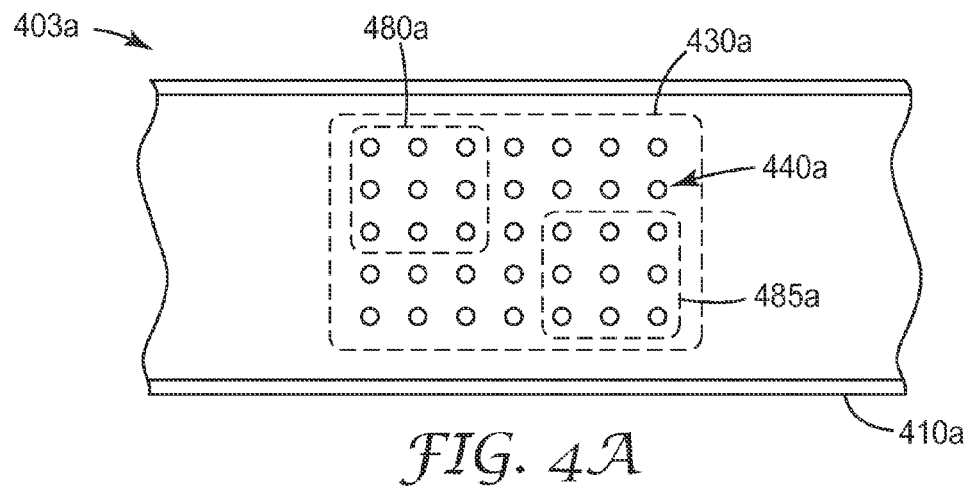
FIGS. 4A-4C shows schematic plan views of lighting elements having different distributions of a plurality of voids.
Figure 4B:
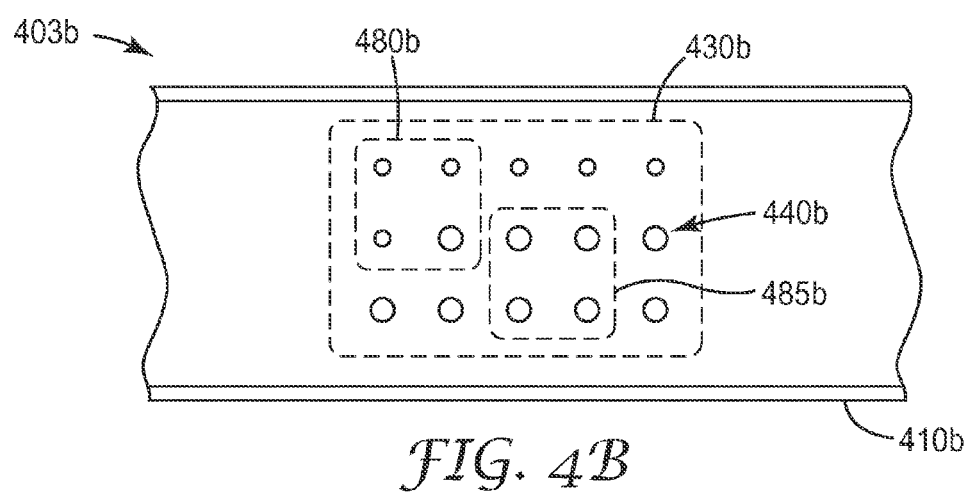
Figure 4C:
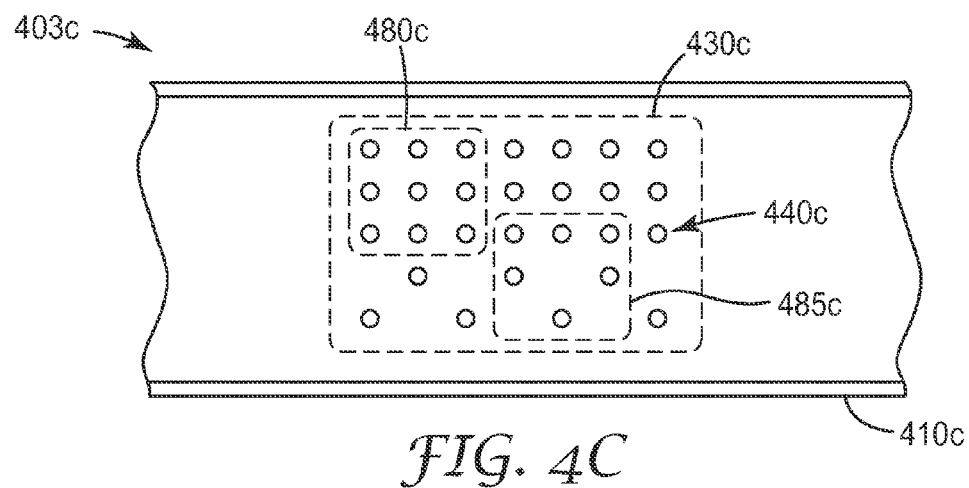

FIGS. 4A-4C shows schematic plan views of light duct extractors having different distributions of a plurality of voids, according to one aspect of the disclosure. It is to be understood that any desired distribution of sizes of voids, shapes of voids, and relative positions of voids are encompassed by the disclosure, and the plan views provided in FIGS. 4A-4C are provided for illustrative purposes only. In FIG. 4A, lighting element 403a includes light duct 410a having an output region 430a and a plurality of uniform sized voids 440a disposed within the output region 430a. An areal density of voids can be defined as the total area of voids (that is, regions where light can leave the light duct 410a) within a predetermined area of the output region. In one particular embodiment, the plurality of uniform sized voids 440a can be uniformly distributed throughout the output region 430a such that a first areal density of voids 480a is equal to a second areal density of voids 485a displaced from the first areal density of voids 480a.

In FIG. 4B, lighting element 403b includes light duct 410b having an output region 430b and a plurality of non-uniform sized voids 440b disposed within the output region 430b. In one particular embodiment, the plurality of non-uniform sized voids 440b can be distributed throughout the output region 430b such that a first areal density of voids 480b is smaller than a second areal density of voids 485b displaced from the first areal density of voids 480b. In FIG. 4C, lighting element 403c includes light duct 410c having an output region 430c and a plurality of uniform sized voids 440c disposed within the output region 430c. In one particular embodiment, the plurality of uniform sized voids 440c can be distributed throughout the output region 430c such that a first areal density of voids 480c is greater than a second areal density of voids 485c displaced from the first areal density of voids 480c.

Figure 5:
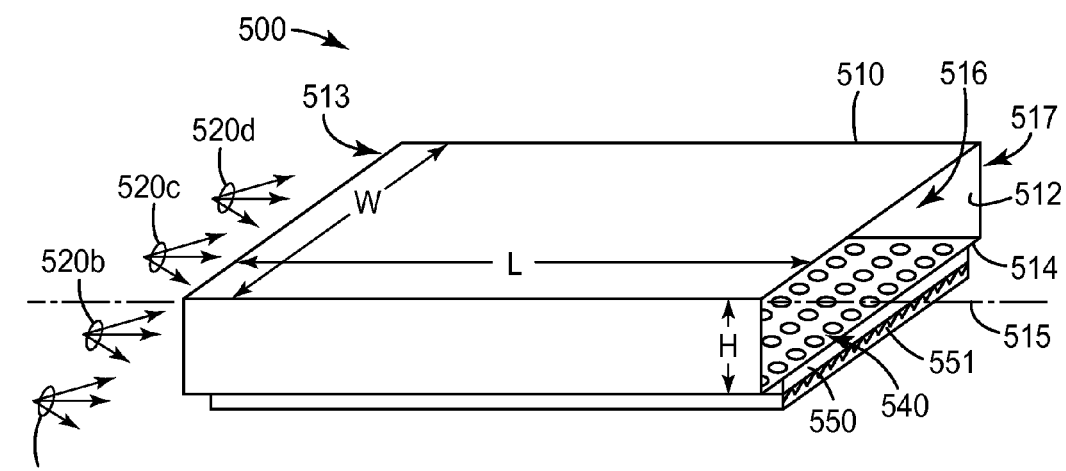
FIG. 5 shows a perspective schematic view of a troffer lighting element.

FIG. 5 shows a perspective schematic view of a troffer lighting element 500, according to one aspect of the disclosure. Each of the elements 510-551 shown in FIG. 5 correspond to like-numbered elements 210-251 shown in FIG. 2B, which have been described previously. For example, longitudinal axis 515 shown in FIG. 5 corresponds to longitudinal axis 215 shown in FIG. 2B, and so on. The troffer lighting element 500 can be considered to be a short, shallow, and wide application of a rectangular light duct 200 as shown in FIGS. 2A-2D; that is, the length L and width W of the troffer lighting element 500 are comparably sized (that is, L~W), whereas the rectangular light duct 200 typically will have a length L several times (for example, 8 times or more) greater than the largest dimension in the cross section (that is, L≥8W). Typical uses for the troffer lighting element 500 are as discrete ceiling-mounted luminaires, and troffers often include multiple light sources to provide for uniform illumination, although solitary light sources can also be used.

Troffer lighting element 500 includes a light duct 510 having a longitudinal axis 515 and a reflective surface 512 surrounding a cavity 516. A plurality of partially collimated light beams 520a-520d similar to the partially collimated light beam 220 of FIG. 2B can be injected into a first end 513 of the light duct 510, and a reflector (not shown) can be placed at a second end 517 of the light duct to redirect the path of light reaching the second end 517 back into the cavity 516, thereby efficiently transporting light throughout the light duct 210. A portion of the partially collimated light beams 520a-520d can leave the light duct 510 through a plurality of voids 540 disposed in the reflective surface 512 in a light output surface where light is extracted. A turning film 550 is positioned adjacent the light output surface proximate an exterior surface 514 of light duct 510. The turning film 550 can intercept light rays exiting the cavity 516 through one of the plurality of voids 540.

A steering film 551 is positioned adjacent the turning film 550 and opposite the exterior surface 514 of the light duct 510. The turning film 550 and steering film 551 are positioned in a manner similar to the description provided in FIGS. 2A-2D, such that a light ray that exits the cavity through the plurality of voids 540 is redirected into a first direction disposed within a first plane perpendicular to the light duct cross-section by the turning film, and into a second direction within a second plane parallel to the light duct cross section by the steering film, as described elsewhere.

One of ordinary skill in the art would readily recognize that in one particular embodiment, the steering film 551 and the turning film 550 of the troffer lighting element 500 can include a two-dimensional steering film 551 that incorporates the functions of each, that is, both turning and steering the extracted partially collimated light beam in two orthogonal directions. In some cases, this can be accomplished by forming three-dimensional microstructures on the two-dimensional steering film 551.

Formulas can be readily derived that form the basis for an approximate analytic model of the angular distribution of luminance transmitted by the rectangular light extractor, and its dependence upon the half angle of collimation within the light duct, the index and included angle of the turning film, and the index and slope distribution of the steering film. The impacts of ray paths other than the principal path, subtle differences in index between the resins, substrates, and support plates within the curved light extractor, the potential for absorption within these components, and the presence of additional features such as the AR coat on the support plate can all be assessed by photometric ray-trace simulation. Predictions of well-executed simulations can be essentially exact insofar as the input descriptions of components and their assembly are accurate.

Generally, the half angle in the along-duct direction of the emission through any lighting element of the form depicted in FIGS. 1-3 is approximately one-half the half angle of the collimation within the light duct, since typically only one-half of the rays within the cone of rays striking the void will exit the light duct. In some cases, it can be desirable to increase the half angle in the along-duct direction without altering the angular distribution emitted in the cross-duct direction. Increasing the half angle in the along-duct direction will elongate the segment of the emissive surface which makes a substantive contribution to the illuminance at any point on a target surface. This can in turn diminish the occurrence of shadows cast by objects near the surface, and may reduce the maximum luminance incident upon the surface, reducing the potential for glare. It generally is not acceptable to increase the half angle along the light duct by simply increasing the half angle within the light duct, as this would alter the cross-duct distribution and ultimately degrade the precision of cross-duct control.

For example, the along-duct distribution is centered approximately about normal for index-1.6, 69-degree turning prisms. It is centered about a direction with a small backward component (relative to the sense of propagation within the light duct) for included angles less than 69 degrees, and about a direction with a forward component for included angles greater than 69 degrees. Thus, a turning film composed of prisms with a plurality of included angles, including some less than 69 degrees and some greater than 69 degrees, can produce an along-duct distribution approximately centered about normal, but possessing a larger along-duct half angle than a film composed entirely of 69-degree prisms.

EXAMPLE

A lighting system was designed for a large auditorium measuring 36 feet (11 m) in width, 58.9 feet (17.9 m) from front to back, and a floor-to-ceiling height that decreased from the front to the rear to accommodate ramped seating. The front floor-to-ceiling height was 21.5 feet (6.55 m) for the first 20 feet (6.1 m), then decreased linearly for the next 23.125 ft (7.05 m) to a floor-to-ceiling height of 9.25 ft (2.82 m), and remained at this height for the final 15.75 ft (4.8 m).

The auditorium was originally illuminated by spotlights used near the front of the auditorium to illuminate the speaker and the whiteboards. The seating area was originally illuminated by additional spotlights contained within five recessed troughs in the ceiling, but subsequently changed to fluorescent fixtures to remedy problems associated with the spotlights. An updated lighting system was desired, using the available recessed troughs. These recessed troughs spanned the width of the auditorium and were located 8.25 ft (2.51 m) apart, with "Trough 1" located 14.875 ft (4.53 m) from the front of the auditorium, and "Trough 5" located 11 ft (3.35 m) from the rear of the auditorium.

The target illuminance on the floor was a uniform warm-white 35 fc, continuously dimmable to zero. The troughs were sufficiently wide and deep to accommodate 6-inch by 6-inch (15.2 cm square) light ducts. The length-to-width ratio of a 6-inch by 6-inch (15.2 cm square) light duct which runs the full width of the auditorium is L/W≈72. This is considerably less than the limit determined for single-ended illumination (L/W≤120), where one end of the light duct includes a reflector to recycle light through the duct. One light engine can be used per light duct, with an anticipated system efficiency exceeding 70 percent.

The floor space within the seating area may be divided into five overlapping 20 foot (6.1 m) wide strips, one associated with each light duct. If each light duct is illuminated by one 30,000-lumen light engine, and if the emission from each light duct is distributed to uniformly illuminate only its 20-foot wide strip (via custom design of a decollimation/steering film for cross-duct angular control), then the expected illuminance from each duct is 30,000 Lm×0.75/(36 ft×20 ft)=31 fc. The two 10-foot strips at the front and rear of the auditorium that are illuminated by only one light duct will receive this uniform 31-fc illumination. Each of the four 10-foot strips between these will receive equal illuminance from two ducts, creating uniform 72-fc illumination. The design includes simultaneous illumination by two light ducts to reduce shadowing from any individual duct. In addition, the light ducts include multi-prism turning film (that is, 62, 69, and 78 degree included angles) to increase the half-angle of along-duct emission to ±25 degrees, to further reduce shadowing, and to reduce the maximum emitted luminance to limit glare.

The cross-duct directional control and along-duct uniformity afforded by the present disclosure permit partitioning of the illuminated surface into distinct segments, each associated with a particular luminaire, with the assurance that the contribution to the illuminance within each segment originating from its luminaire will be substantially uniform. This in turn allows very-simple evaluations of both the level of illuminance and the luminance uniformity, which are not possible for traditional lighting systems. In this sense, ducted illumination enables a new and simplified paradigm for linear lighting-system design.

Each of the light duct systems used in the troughs consists of eight four-foot (1.23 m) segments illuminated at one end by a two-foot (0.61 m) long light engine and terminated at the opposite end by a mirror. Thus, the emitting portion of each luminaire is 32 feet (9.75 m) long, centered within the 36-foot (11 m) width of the auditorium. Each luminaire utilizes the same pattern of perforated ESR films (15, 19, 19, 30, 30, 40, 51, 51 percent), selected from existing films having 9, 15, 19, 30, 40, and 51-percent open area. Each luminaire uses the same 62, 69, 78-degree multi-prism turning film, however different decollimation/steering films calculated to spread the light uniformly over the floor were used, compensating for the varying floor-ceiling distance. As anticipated, the calculated system efficiencies are slightly greater than 70 percent.

The cross-duct illumination patterns fill the targeted areas with near-uniform illuminance, even in those locations where the target area is substantially tilted (Luminaire 3) or contains a discontinuity in slope (Luminaire 5). The along-duct uniformity is very good except within a couple of feet of the auditorium walls. Reflection from the walls (not accounted for in the simulation) will likely fill in some of this deficit. The maximum luminance emitted by any of the luminaires is approximately 22,000 $cd/m^2/sr$ at full power. For reference, the surface brightness of a standard-output T8 fluorescent is approximately 14,000 $cd/m^2/sr$.

The total power consumption is less than 2 kW at full power. Although baseline data for the fluorescent system was unavailable to compare to this, it is likely that the power consumption of the ducted system will be considerably less than that of the fluorescent system at comparable levels of illumination. This is not because of higher luminous efficacy of the LED sources, but rather the result of delivering light only where it is needed, and thus using less light.

Finally, the appearance of the auditorium when lit by ducted illumination will be dramatically different than it is today. The ceiling, and to a lesser extent the walls, will be unusually dark. And from most perspectives the emitting surfaces of the ducts will be uniform and dim. These aesthetic attributes (which may or may not be appreciated) are a direct consequence of the precision angular control of emission of the extracted light from the light ducts.

Following are a list of embodiments of the present disclosure.

Item 1 is a lighting element, comprising: a light duct having a longitudinal axis, a light duct cross-section perpendicular to the longitudinal axis, a reflective interior surface defining a cavity, and an exterior surface; a plurality of voids disposed in the reflective interior surface defining a light output surface, whereby light can exit the cavity; a turning film disposed adjacent to the light output surface and exterior to the cavity, the turning film comprising parallel prismatic microstructures, each of the parallel prismatic microstructures having a vertex adjacent the light output surface of the light duct; and a steering film comprising a plurality of ridges adjacent the turning film and opposite the light output surface, each ridge parallel to the longitudinal axis and disposed to refract an incident light ray from the turning film, wherein a light ray that exits the cavity through the light output surface is redirected by the turning film within a first plane perpendicular to the light duct cross-section, and further redirected by the steering film within a second plane parallel to the light duct cross section.

Item 2 is the lighting element of item 1, wherein each of the parallel prismatic microstructures are orientated perpendicular to the longitudinal axis.

Item 3 is the lighting element of item 1 or item 2, wherein the light duct cross-section is constant along the longitudinal axis.

Item 4 is the lighting element of item 1 to item 3, wherein the light duct cross-section comprises a polygon, a rectangle, or a square.

Item 5 is the lighting element of item 1 to item 4, wherein a longitudinal dimension of the light duct along the longitudinal axis is at least eight times larger than a maximum dimension of the light duct cross-section.

Item 6 is the lighting element of item 1 to item 5, wherein at least one of the voids comprises a through-hole.

Item 7 is the lighting element of item 1 to item 6, wherein at least one of the voids comprises a visible-light transparent region.

Item 8 is the lighting element of item 7, wherein the visible-light transparent region comprises a deformed region.

Item 9 is the lighting element of item 8, wherein the deformed region is formed by heat and/or pressure deformation.

Item 10 is the lighting element of item 1 to item 9, wherein the turning film and the steering film are each disposed on separate polymer substrates.

Item 11 is the lighting element of item 1 to item 10, wherein the vertex comprises an included vertex angle between 54 and 86 degrees.

Item 12 is the lighting element of item 11, wherein the included vertex angle of at least two of the parallel prismatic microstructures are different.

Item 13 is the lighting element of item 1 to item 12, wherein at least two of the plurality of voids have different cross-sectional areas.

Item 14 is the lighting element of item 1 to item 13, wherein the plurality of voids are disposed such that an areal density of voids varies in a perpendicular direction to the longitudinal axis, varies in a parallel direction to the longitudinal axis, or varies across a combination thereof.

Item 15 is the lighting element of item 1 to item 14, wherein each of the plurality of voids has a uniform void cross-sectional area.

Item 16 is a lighting element, comprising: a light duct having a longitudinal axis, a light duct cross-section perpendicular to the longitudinal axis, a reflective interior surface defining a cavity, and an exterior surface; a plurality of voids disposed in the reflective interior surface defining a light output surface, whereby light can exit the cavity; a turning film disposed adjacent to the light output surface and exterior to the cavity, the turning film comprising parallel prismatic microstructures, each of the parallel prismatic microstructures perpendicular having a vertex adjacent the light output surface of the light duct; and a two-dimensional steering film comprising a plurality of microstructures adjacent the turning film and opposite the light output surface, each microstructure disposed to refract an incident light ray from the turning film, wherein a light ray that exits the cavity through the light output surface is redirected by the turning film within a first plane perpendicular to the light duct cross-section, and further redirected by the two-dimensional steering film within the first plane and a second plane parallel to the light duct cross section.

Item 17 is the lighting element of item 16, wherein each of the parallel prismatic microstructures are orientated perpendicular to the longitudinal axis.

Item 18 is the lighting element of item 15 or item 16, wherein the light duct cross-section is constant along the longitudinal axis.

Item 19 is the lighting element of item 15 to item 18, wherein the light duct cross-section comprises a polygon, a rectangle, or a square.

Item 20 is the lighting element of item 15 to item 19, wherein a longitudinal dimension of the light duct along the longitudinal axis is less than eight times larger than a maximum dimension of the light duct cross-section.

Item 21 is the lighting element of item 15 to item 20, wherein at least one of the voids comprises a through-hole.

Item 22 is the lighting element of item 15 to item 21, wherein at least one of the voids comprises a visible-light transparent region.

Item 23 is the lighting element of item 22, wherein the visible-light transparent region comprises a deformed region.

Item 24 is the lighting element of item 23, wherein the deformed region is formed by heat and/or pressure deformation.

Item 25 is the lighting element of item 15 to item 24, wherein the turning film and the steering film are each disposed on separate polymer substrates.

Item 26 is the lighting element of item 15 to item 25, wherein the vertex comprises an included vertex angle between 54 and 86 degrees.

Item 27 is the lighting element of item 26, wherein the included vertex angle of at least two of the parallel prismatic microstructures are different.

Item 28 is the lighting element of item 15 to item 27, wherein at least two of the plurality of voids have different cross-sectional areas.

Item 29 is the lighting element of item 15 to item 28, wherein the plurality of voids are disposed such that an areal density of voids varies in a perpendicular direction to the longitudinal axis, varies in a parallel direction to the longitudinal axis, or varies across a combination thereof.

Item 30 is the lighting element of item 15 to item 29, wherein each of the plurality of voids has a uniform void cross-sectional area.

Item 31 is a lighting system, comprising: a lighting element according any of item 1 to item 30; and a light source configured to inject light into the lighting element within a collimation half-angle less than 30 degrees of a longitudinal direction parallel to the longitudinal axis, whereby the collimation half-angle of the light is maintained as the light travels along the light duct cavity, exits the cavity through the plurality of voids, and is redirected by the turning film and the steering film.

Item 32 is the lighting system of item 31, further comprising a reflector disposed perpendicular to the longitudinal axis and at an end of the light duct opposite the light source.

Item 33 is the lighting system of item 31 or item 32, further comprising a second light source configured to inject a second light into the lighting element within a collimation half-angle less than 30 degrees of the longitudinal direction.

Item 34 is the lighting system of item 33, wherein at least one of the light source or the second light source comprises a solar light source.

Item 35 is the lighting system of item 34, wherein the solar light source comprises a solar concentrator.

Item 36 is the lighting element of item 1 to item 35, wherein the plurality of voids comprise shapes selected from arcs, circles, ellipses, ovals, triangles, rectangles, pentagons, X-shapes, zig-zags, stripes, slashes, stars, and combinations thereof.

Item 37 is a method for illuminating a region, comprising: providing a lighting element according to any of item 1 to item 36; selecting an illumination region exterior to the lighting element; selecting the plurality of voids, the turning film and the steering film to direct the light beam that exits the cavity to the illumination region; and injecting light into the light duct within a collimation half-angle less than 30 degrees of a propagation parallel to the longitudinal axis, whereby the light beam that exits the cavity is directed to the illumination region.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A lighting element, comprising:
   a light duct having a longitudinal axis, a light duct cross-section perpendicular to the longitudinal axis, a reflective interior surface defining a cavity, and an exterior surface;
   a plurality of voids disposed in the reflective interior surface defining a light output surface, whereby light can exit the cavity;
   a turning film disposed adjacent to the light output surface and exterior to the cavity, the turning film comprising parallel prismatic microstructures, each of the parallel prismatic microstructures having a vertex adjacent the light output surface of the light duct; and
   a steering film comprising a plurality of ridges adjacent the turning film and opposite the light output surface, each ridge parallel to the longitudinal axis and disposed to refract an incident light ray from the turning film, wherein a light ray that exits the cavity through the light output surface is redirected by the turning film within a first plane perpendicular to the light duct cross-section, and further redirected by the steering film within a second plane parallel to the light duct cross section.

2. The lighting element of claim 1, wherein each of the parallel prismatic microstructures are orientated perpendicular to the longitudinal axis.

3. The lighting element of claim 1, wherein the light duct cross-section is constant along the longitudinal axis.

4. The lighting element of claim 1, wherein the light duct cross-section comprises a polygon, a rectangle, or a square.

5. The lighting element of claim 1, wherein a longitudinal dimension of the light duct along the longitudinal axis is at least eight times larger than a maximum dimension of the light duct cross-section.

6. The lighting element of claim 1, wherein at least one of the voids comprises a through-hole.

7. The lighting element of claim 1, wherein at least one of the voids comprises a visible-light transparent region.

8. The lighting element of claim 1, wherein at least two of the plurality of voids have different cross-sectional areas.

9. The lighting element of claim 1, wherein the plurality of voids are disposed such that an areal density of voids varies in a perpendicular direction to the longitudinal axis, varies in a parallel direction to the longitudinal axis, or varies across a combination thereof.

10. The lighting element of claim 1, wherein each of the plurality of voids has a uniform void cross-sectional area.

11. A lighting system, comprising:
a lighting element according to claim 1; and
a light source configured to inject light into the lighting element within a collimation half-angle less than 30 degrees of a longitudinal direction parallel to the longitudinal axis,
whereby the collimation half-angle of the light is maintained as the light travels along the light duct cavity, exits the cavity through the plurality of voids, and is redirected by the turning film and the steering film.

12. The lighting system of claim 11, further comprising a reflector disposed perpendicular to the longitudinal axis and at an end of the light duct opposite the light source.

13. The lighting system of claim 11, further comprising a second light source configured to inject a second light into the lighting element within a collimation half-angle less than 30 degrees of the longitudinal direction.

14. The lighting system of claim 13, wherein at least one of the light source or the second light source comprises a solar light source.

15. The lighting system of claim 14, wherein the solar light source comprises a solar concentrator.

16. A method for illuminating a region, comprising:
providing a lighting element according to claim 1;
selecting an illumination region exterior to the lighting element;
selecting the plurality of voids, the turning film and the steering film to direct the light beam that exits the cavity to the illumination region; and
injecting light into the light duct within a collimation half-angle less than 30 degrees of a propagation parallel to the longitudinal axis, whereby the light beam that exits the cavity is directed to the illumination region.

17. A lighting element, comprising:
a light duct having a longitudinal axis, a light duct cross-section perpendicular to the longitudinal axis, a reflective interior surface defining a cavity, and an exterior surface;
a plurality of voids disposed in the reflective interior surface defining a light output surface, whereby light can exit the cavity;
a turning film disposed adjacent to the light output surface and exterior to the cavity, the turning film comprising parallel prismatic microstructures, each of the parallel prismatic microstructures having a vertex adjacent the light output surface of the light duct; and
a two-dimensional steering film comprising a plurality of microstructures adjacent the turning film and opposite the light output surface, each microstructure disposed to refract an incident light ray from the turning film,
wherein a light ray that exits the cavity through the light output surface is redirected by the turning film within a first plane perpendicular to the light duct cross-section, and further redirected by the two-dimensional steering film within the first plane and a second plane parallel to the light duct cross section.

18. The lighting element of claim 17, wherein each of the parallel prismatic microstructures are orientated perpendicular to the longitudinal axis.

19. The lighting element of claim 17, wherein at least one of the voids comprises a through-hole.

20. The lighting element of claim 17, wherein at least one of the voids comprises a visible-light transparent region.

* * * * *